US012731486B2

(12) United States Patent
Singh

(10) Patent No.: US 12,731,486 B2
(45) Date of Patent: Sep. 8, 2026

(54) SYSTEMS AND METHODS FOR CONSENSUS-BASED LOCAL ROUTE PLANNING

(71) Applicant: Toyota Jidosha Kabushiki Kaisha, Toyota (JP)

(72) Inventor: Jaspal Singh, Hicksville, NY (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 134 days.

(21) Appl. No.: 18/538,675

(22) Filed: Dec. 13, 2023

(65) Prior Publication Data

US 2025/0201120 A1 Jun. 19, 2025

(51) Int. Cl.

| | |
|---|---|
| ***G08G 1/0967*** | (2006.01) |
| ***B60W 30/18*** | (2012.01) |
| ***G05D 1/69*** | (2024.01) |
| ***G05D 1/698*** | (2024.01) |

(Continued)

(52) U.S. Cl.

CPC . *G08G 1/096791* (2013.01); *B60W 30/18163* (2013.01); *G05D 1/69* (2024.01); *G05D 1/698* (2024.01); *G05D 1/6983* (2024.01); *G05D 1/6987* (2024.01); *G08G 1/0112* (2013.01); *G08G 1/0141* (2013.01); *G08G 1/052* (2013.01);

(Continued)

(58) Field of Classification Search

CPC ........... G08G 1/096791; G08G 1/0112; G08G 1/0141; G08G 1/052; G08G 1/096775; B60W 30/18163; B60W 2556/10; B60W 2556/15

See application file for complete search history.

(56) References Cited

U.S. PATENT DOCUMENTS

| | | | | |
|---|---|---|---|---|
| 9,436,187 | B2 | 9/2016 | Arbogast et al. | |
| 9,565,625 | B1 * | 2/2017 | MacNeille | H04W 48/18 |
| 10,089,876 | B1 * | 10/2018 | Ramasamy | G05D 1/028 |

(Continued)

FOREIGN PATENT DOCUMENTS

| | | | |
|---|---|---|---|
| CN | 108924789 A * | 11/2018 | H04W 88/06 |
| CN | 113096400 A | 7/2021 | |

(Continued)

OTHER PUBLICATIONS

CN 108924789 A, Chen et al., "Internet of vehicles communication mode selection method and mode", Filed: Jun. 21, 2018, Pub: Nov. 30, 2018, English Translation (Year: 2018).*

(Continued)

*Primary Examiner* — Thomas E Worden
*Assistant Examiner* — Benjamin J Brosh
(74) *Attorney, Agent, or Firm* — Dinsmore & Shohl LLP

(57) ABSTRACT

A system and method for local route planning includes a processor and a communication device operable to wirelessly communicate with one or more neighboring vehicles at a location. The processor is operable to send a coordination request based on an intended action of an inquiry vehicle to the neighboring vehicles at the location, determine whether a positive coordination response is received from a coordination vehicle out of the neighboring vehicles, in response to the received positive coordination response, communicate with the coordination vehicle to act according to the coordination request, and operate the inquiry vehicle according to the intended action.

18 Claims, 6 Drawing Sheets

(51) Int. Cl.
*G08G 1/01* (2006.01)
*G08G 1/052* (2006.01)

(52) U.S. Cl.
CPC ... *G08G 1/096775* (2013.01); *B60W 2556/10* (2020.02); *B60W 2556/45* (2020.02)

(56) References Cited

U.S. PATENT DOCUMENTS 10,861,183 B2 12/2020 Kim et al.
2013/0083679 A1* 4/2013 Krishnaswamy ...... G08G 1/093 370/252
2016/0358479 A1* 12/2016 Riedelsheimer ..... G08G 1/0145
2017/0212527 A1* 7/2017 Park ......................... G08G 1/22
2018/0253976 A1* 9/2018 Inam ........................ G08G 1/22
2018/0321689 A1* 11/2018 Lehmann ............... G08G 1/163
2019/0098471 A1* 3/2019 Rech ........................ G08G 1/22
2019/0243381 A1* 8/2019 Strunck ............ G08G 1/096791
2020/0365033 A1* 11/2020 Cheng .................. G08G 1/0145
2021/0146922 A1* 5/2021 Fuchs .............. G08G 1/096791
2021/0245758 A1* 8/2021 Ahmad .................. G08G 1/167
2022/0262253 A1* 8/2022 Wu ........................ G08G 1/091
2022/0375344 A1* 11/2022 Yang ...................... G08G 1/167
2023/0131851 A1* 4/2023 Yu .......................... G08G 1/166 701/301
2023/0143929 A1* 5/2023 Yun ........................ G08G 1/091 701/119
2023/0394957 A1* 12/2023 Zeiynali Farid ..... G08G 1/0112
2024/0262381 A1* 8/2024 Wang .................. B60W 60/001
2025/0095410 A1* 3/2025 Wang ..................... G07C 5/008
2025/0095491 A1* 3/2025 Wang ............... G08G 1/096791
2025/0128733 A1* 4/2025 Lee ..................... B60W 60/001
2025/0162576 A1* 5/2025 Lee ..................... B60W 30/182

FOREIGN PATENT DOCUMENTS

CN 114802269 A 7/2022
CN 115195739 A * 10/2022 ...... B60W 30/18163
CN 114339842 B 12/2022
DE 102012011994 A1 * 12/2013 ............. G08G 1/163

OTHER PUBLICATIONS

CN 115195739 A, Vehicle lane changing method and device, electronic equipment and storage medium. Ji et al., Filed: Jul. 21, 2022 Pub: Oct. 18, 2022, English Translation (Year: 2022).*

DE 102012011994 A1, Method for cooperatively controlling traffic conditions of motor cars, involves transmitting current driving information from first vehicle to second vehicle, where intentional handling of first vehicle adapts handling of second vehicle, Wegwerth et al., F: Jun. 16, 2012, p. Dec. 19, 2013 (Year: 2013).*

CN 108924789 A, Chen et al., "Internet of Vehicles Communication Mode Selection Method and Device", Published Nov. 30, 2018, English Translation provided by Espacenet (Year: 2018).*

* cited by examiner

SYSTEMS AND METHODS FOR CONSENSUS-BASED LOCAL ROUTE PLANNING

TECHNICAL FIELD

The present disclosure relates to systems and methods for local route planning, more specifically, to systems and methods for local route planning through vehicle cooperation.

BACKGROUND

Traffic congestion occurs when individual drivers prioritize their own interests without considering the collective impact on traffic flow. This self-interested behavior can lead to bottlenecks, longer travel times, and increased fuel consumption. Accordingly, a need exists for a system and method for collaborating among vehicles, particularly those in close proximity, for route planning and traffic management.

SUMMARY

In one embodiment, a system for local route planning includes a processor and a communication device operable to wirelessly communicate with one or more neighboring vehicles at a location. The processor is operable to send a coordination request based on an intended action of an inquiry vehicle to the neighboring vehicles at the location, determine whether a positive coordination response is received from a coordination vehicle out of the neighboring vehicles, in response to the received positive coordination response, communicate with the coordination vehicle to act according to the coordination request, and operate the inquiry vehicle according to the intended action.

In another embodiment, a method for local route planning includes sending a coordination request based on an intended action of an inquiry vehicle to one or more neighboring vehicles at a location using a communication device, determining whether a positive coordination response is received from a coordination vehicle out of the neighboring vehicles, in response to the received positive coordination response, communicating with the coordination vehicle to act according to the coordination request, and operating the inquiry vehicle according to the intended action.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
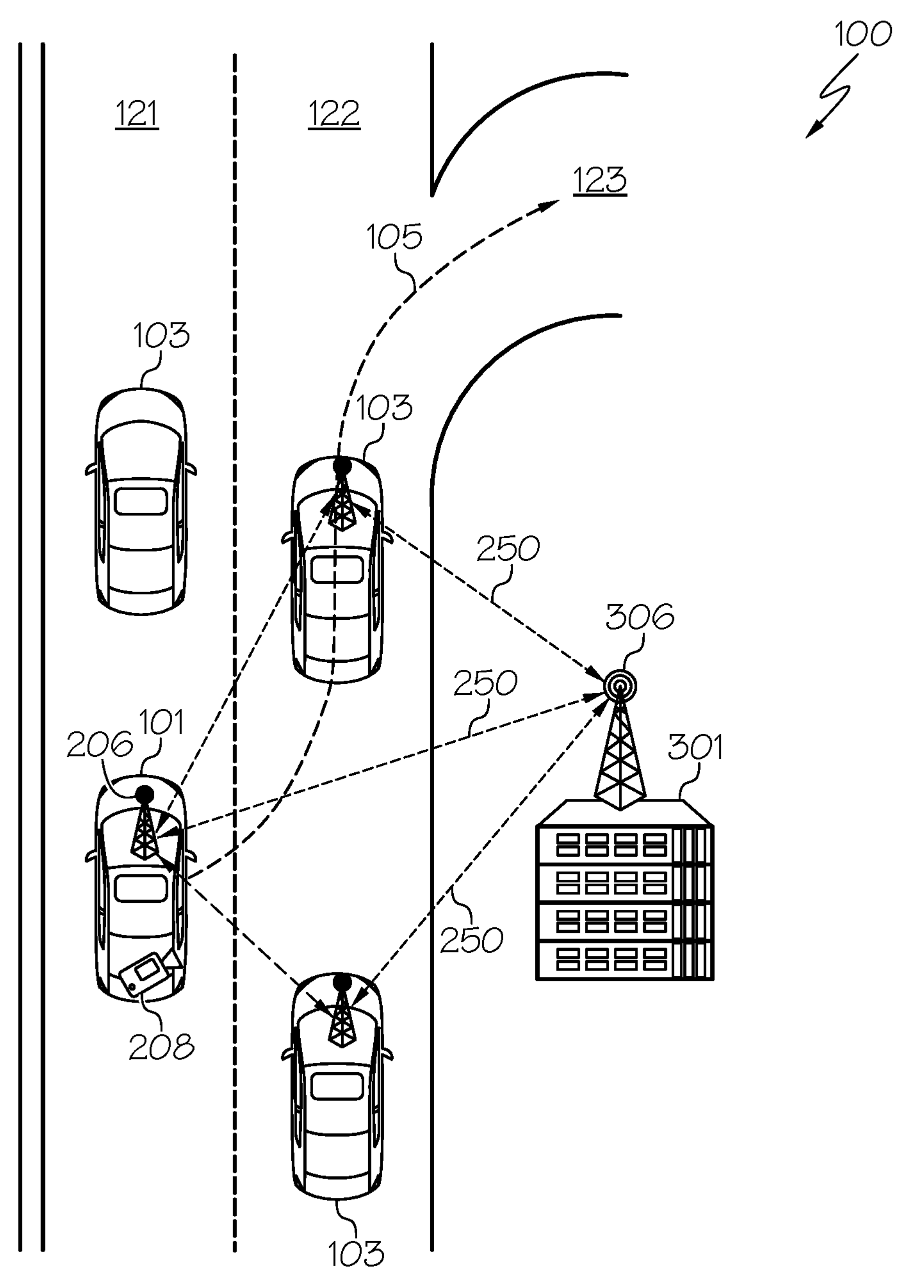
FIG. 1 schematically depicts an example system for consensus-based local route planning of the present disclosure, in accordance with one or more embodiments shown and described herewith.

The embodiments disclosed herein include systems and methods for consensus-based local route planning. Individual drivers tend to focus on their own needs and may not consider how their actions may affect their neighboring vehicles and overall traffic flow. The drivers prioritize their individual driving goals, which can include following other vehicles, changing lanes, or engaging in other driving behaviors that serve their own interests. This self-interest driving approach can result in bottlenecks (areas where traffic gets undesirably slowed or stopped), longer travel times for all the vehicles, and increased fuel consumption. The self-interest driving approach may contribute to traffic congestion when it leads to suboptimal traffic flow or coordination among drivers. The disclosed systems and methods facilitate collaboration among vehicles, particularly those close to each other at a location, to improve route planning and manage traffic more effectively. The disclosed systems and methods help users make better-informed decisions and coordinate with other vehicles to alleviate traffic congestion and assist each other in fulfilling their driving goals.

Various embodiments of the methods and systems for consensus-based local route planning are described in more detail herein. Whenever possible, the same reference numerals will be used throughout the drawings to refer to the same or like parts.

As used herein, the singular forms “a,” “an” and “the” include plural referents unless the context clearly dictates otherwise. Thus, for example, reference to “a” component includes aspects having two or more such components unless the context clearly indicates otherwise.

FIG. 1 schematically depicts an example consensus-based local route planning system 100. The system 100 includes a plurality of vehicles 101 and 103. Each of the vehicles 101 and 103 includes a communication device (such as network interface hardware 206) operable to wirelessly communicate with each other. The system may further include one or more servers 301 including server communication devices (such as server network interface hardware 306) operable to communicate with the plurality of vehicles 101 and 103.

Each of the vehicles 101 and 103 may be an automobile or any other passenger or non-passenger vehicle such as, for example, a terrestrial, aquatic, and/or airborne vehicle. Each of the vehicles 101 and 103 may be an autonomous vehicle that navigates its environment with limited human input or without human input. Each of the vehicles 101 and 103 may drive on a road and perform vision-based lane centering, e.g., using a sensor. Each of the vehicles 101 and 103 may include actuators for driving the vehicle, such as a motor, an engine, or any other powertrain. The vehicles 101 and 103 may move on various surfaces at a location, such as, without limitations, roads, highways, streets, expressway, bridges, tunnels, parking lots, garages, off-road trails, railroads, or any surfaces where the vehicles may operate.

In embodiments, the plurality of vehicles 101 and 103 includes an inquiry vehicle 101, and one or more neighboring vehicles 103. The inquiry vehicle 101 may send coordination requests to the neighboring vehicles 103 for consensus-based local route planning. The neighboring vehicles 103 may coordinate with the inquiry vehicle 101 to fulfill the requested coordination. Each of the plurality of vehicles 101 and 103 may be an inquiry vehicle 101 and a neighboring vehicle 103 by sending coordination requests to other vehicles and assisting other vehicles to fulfill the requested coordination of other vehicles.

In embodiments, each of the inquiry vehicle 101 and the neighboring vehicles 103 may include a network interface hardware 206 and communicate with each other via wireless communications 250. The inquiry vehicle 101 and the neighboring vehicles 103 may transmit, without limitations, coordination requests, positive coordination responses, negative coordination responses, and priority pool. The coordination requests are based on an intended action 105 of the inquiry vehicle 101. The intended action 105 may be, without limitations, lane changing, merging into a highway, passing, overtaking, U-turn, or exiting roundabouts. The coordination requests may include a position, a speed, a direction, the intended action 105 of the inquiry vehicle 101, and a coordination action of the one of the neighboring vehicles. For example, as illustrated in FIG. 1, the inquiry vehicle 101 may have an intended action 105 of lane changing from left lane 121 to right lane 122 and further moving to the exit roadway 123 to leave the main-traveled way. The inquiry vehicle 101 may transmit a coordination request for lane changing to the neighboring vehicles 103 of the right lane 122, including the position, the speed, the direction, the intended action 105 of the inquiry vehicle 101. The coordination request may further include coordination actions of the neighboring vehicles 103, such as requesting a following neighboring vehicle 103 to make space for the inquiry vehicle 101 to merge into the right lane 122 by keeping an extended following distance to the front neighboring vehicle 103.

The neighboring vehicles 103, after receiving the coordination requests, may send positive coordination responses or negative coordination response to the inquiry vehicle 101. In embodiments, the neighboring vehicles 103 may send positive coordination responses, indicating a willingness to cooperate, or negative coordination responses, indicating an unwillingness to cooperate. After receiving the positive coordination response, the inquiry vehicle 101 may communicate with the coordination vehicles (i.e. the neighboring vehicles 103 sending the positive coordination responses) to proceed with the coordination request. In some embodiments, the inquiry vehicle 101 may select one of the coordination vehicles to cooperate and transmit a gratitude message to decline the positive coordination responses from other coordination vehicles. The selective coordination may occur when the cooperation of just one coordination vehicle is desirable to fulfill the intended action 105. In some embodiments, the inquiry vehicle 101 may not receive any positive coordination response. The inquiry vehicle 101 may adjust and resend the coordination request to the neighboring vehicles 103 in search for another round of responses that may include at least one positive coordination response.

The inquiry vehicle 101 and the neighboring vehicles 103 may include vision sensors 208 and other sensors 212. The vision sensors 208 and the other sensors 212 may be used for executing the coordination operation according to the intended action 105. The inquiry vehicle 101 and the neighboring vehicles 103 may include one or more vehicle modules, including, without limitations, a coordination request and response module 222, a decentralized coordination module 232, and a centralized coordination module 242. The one or more modules may be utilized by vehicles in operating the vehicles in cooperating with each other in executing the local route planning. For example, once the inquiry vehicle 101 receives a positive coordination response from one of the neighboring vehicles 103 (referred to as a cooperation vehicle 103), the inquiry vehicle 101 may establish ongoing communication with the cooperation vehicle 103 to facilitate cooperation. Both the inquiry vehicle 101 and the cooperation vehicle 103 may exchange real-time and future operation data, and further utilize vision sensors 208 to monitor each other's actions and act accordingly to ensure cooperation based on the coordination request.

The servers 301 may be, without limitations, edge servers, telematics servers, fleet management servers, connected car platforms, application servers, Internet of Things (IoTs) servers, or any server with the capability to transmit data with vehicles. The server 301 may include server network interface hardware 306 and communicate with the inquiry vehicle 101 and the neighboring vehicles 103 via wireless communications 250. The server 301 may store a server coordination module 322 for coordinating the inquiry vehicle 101 and the neighboring vehicles 103 in fulfilling the route planning of more than one vehicles among the inquiry vehicle 101 and the neighboring vehicles 103.

Each of the vehicle modules and the server modules may include one or more machine learning algorithms or neural networks. The vehicle modules and the server modules may be trained and provided machine learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (Sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof. In some embodiments, a convolutional neural network (CNN) may be utilized. For example, a convolutional neural network (CNN) may be used as an ANN that, in a field of machine learning, for example, is a class of deep, feed-forward ANNs applied for audio analysis of the recordings. CNNs may be shift or space invariant and utilize shared-weight architecture and translation. Further, each of the various modules may include a generative artificial intelligence algorithms. The generative artificial intelligence algorithm may include a general adversarial network (GAN) that has two networks, a generator model and a discriminator model. The generative artificial intelligence algorithm may also be based on variation autoencoder (VAE) or transformer-based models.

The one or more vehicle modules may be pre-trained using training data of the consensus-based local route planning, including ground-truth examples and scenarios where multiple entities (e.g. vehicles) plan their routes while considering the positions of other entities, intentions of other entities, and factors (for example, without limitation, vehicles not communicating with the system 100, environments, weather, road conditions, etc.). The pre-training may include labeling the entities and desirable consensus-based local route planning results in the examples and scenarios and using one or more neural networks to learn to predict the desirable and undesirable route planning results based on the training data. The pre-training may further include fine tuning, evaluation, and testing steps. The one or more vehicle modules may be continuously trained using the real-world collected data to adapt to changing conditions and factors and improve the performance over time.

Similar to the vehicle modules, server coordination module 322 may be pre-trained using training data of the consensus-based local route planning. The pre-training may include labeling sample data and using one or more neural networks to learn to predict the desirable and undesirable route planning results based on the training data. The pre-training may further include fine tuning, evaluation, and testing steps. The server coordination module 322 may be continuously trained using the real-world collected data to adapt to changing conditions and factors and improve the performance over time.

The wireless communication 250 may connect various components, the vehicles 101 and 103, and/or the server 301 of the system 100 and allow signal transmission between the various components, the vehicles, and/or the server 301 of the system 100. In some embodiments, the wireless communications 250 may facilitate the transmission of wireless signals, such as WiFi, Bluetooth®, Near Field Communication (NFC), and the like.

Figure 2:
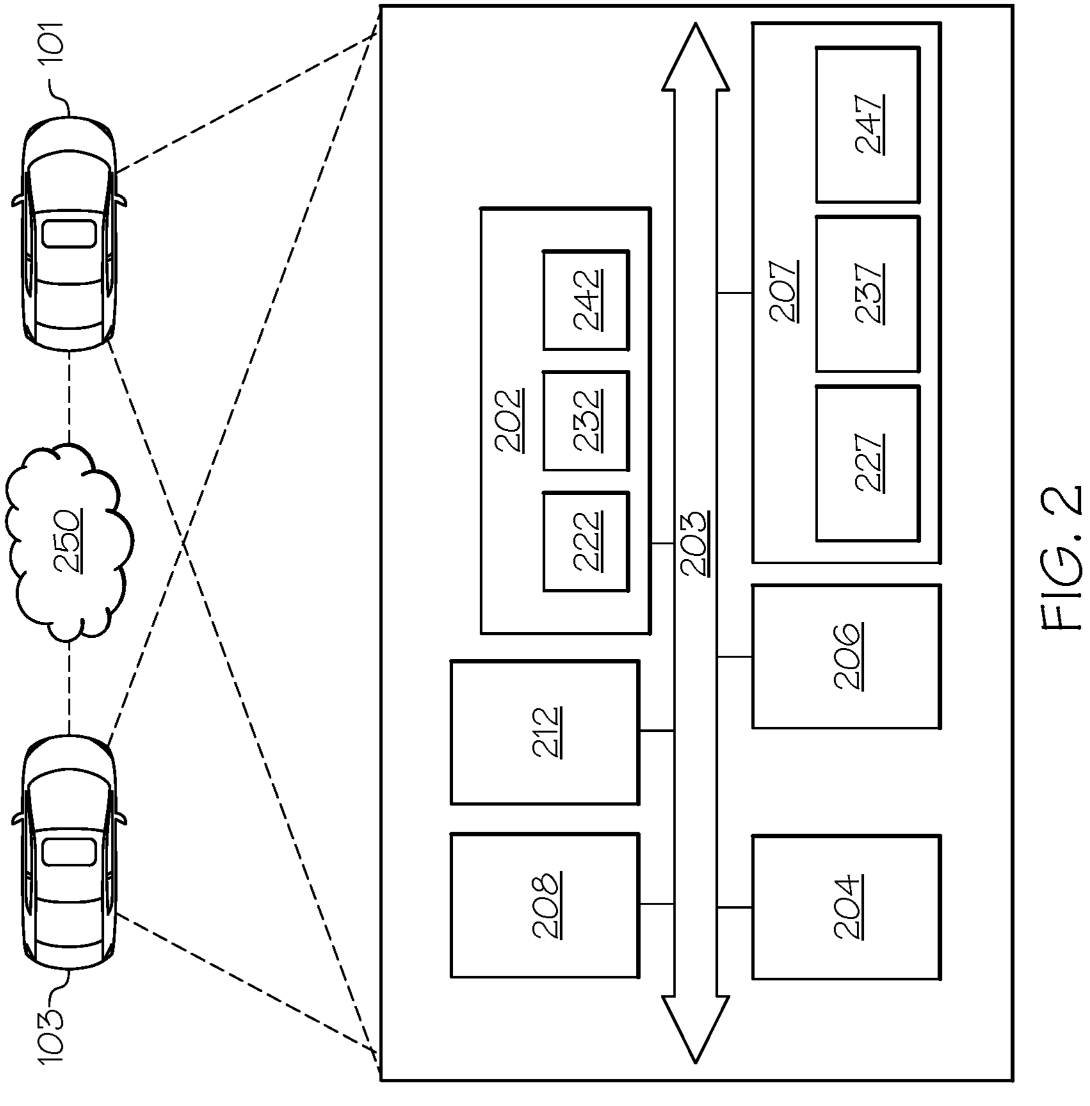
FIG. 2 schematically depicts example components of the system for consensus-based local route planning based on vehicle-to-vehicle communications of the present disclosure, according to one or more embodiments shown and described herein.
Figure 3:
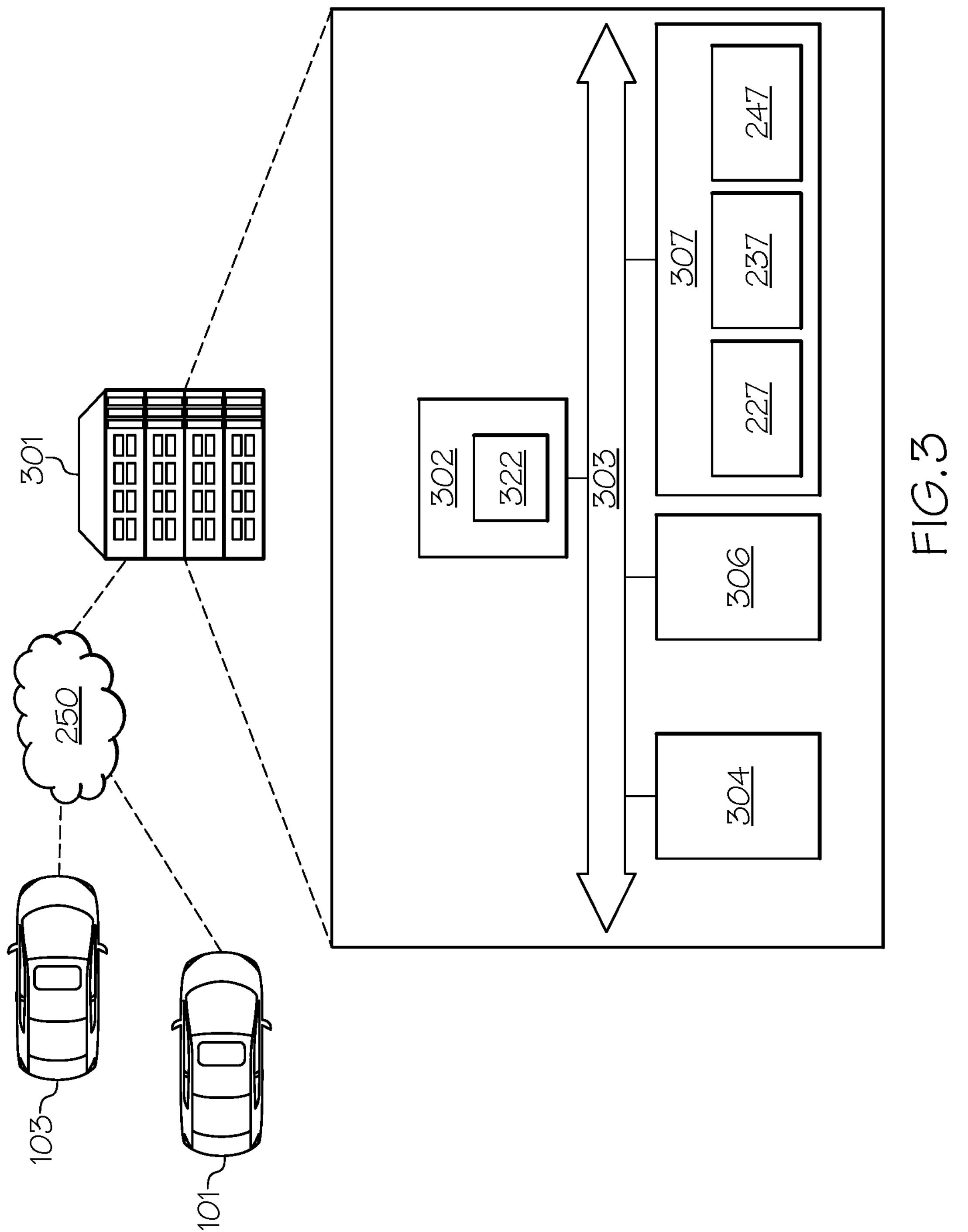
FIG. 3 schematically depicts example components of the system for consensus-based local route planning based on vehicle-to-server communications of the present disclosure, according to one or more embodiments shown and described herein.

FIGS. 2 and 3 schematically depict example components of the system 100 for consensus-based local route planning. The system 100 includes the inquiry vehicle 101 and a neighboring vehicle 103, and may further include the server 301. While FIG. 2 depicts one inquiry vehicle 101 and one neighboring vehicle 103, more than two inquiry vehicles 101 or more than two neighboring vehicles 103 may communicate with each other. Similarly, while FIG. 3 depicts one inquiry vehicle 101, one neighboring vehicle 103, and one server 301, more than two inquiry vehicles 101, more than two neighboring vehicles 103, or two servers 301 may communicate with each other.

Referring to FIG. 2, the inquiry vehicle 101 or the neighboring vehicle 103 may include one or more processors 204. Each of the one or more processors 204 may be any device capable of executing machine-readable and executable instructions. The instructions may be in the form of a machine-readable instruction set stored in data storage component 207 and/or the memory component 202. Accordingly, each of the one or more processors 204 may be a controller, an integrated circuit, a microchip, a computer, or any other computing device. The one or more processors 204 are coupled to a communication path 203 that provides signal interconnectivity between various modules of the system. Accordingly, the communication path 203 may communicatively couple any number of processors 204 with one another, and allow the modules coupled to the communication path 203 to operate in a distributed computing environment. Specifically, each of the modules may operate as a node that may send and/or receive data. As used herein, the term "communicatively coupled" means that coupled components are capable of exchanging data signals with one another such as, without limitations, electrical signals via conductive medium, electromagnetic signals via air, optical signals via optical waveguides, and the like.

Accordingly, the communication path 203 may be formed from any medium that is capable of transmitting a signal such as, without limitations, conductive wires, conductive traces, optical waveguides, or the like. In some embodiments, the communication path 203 may facilitate the transmission of wireless signals, such as WiFi, Bluetooth®, Near Field Communication (NFC), and the like. Moreover, the communication path 203 may be formed from a combination of mediums capable of transmitting signals. In one embodiment, the communication path 203 comprises a combination of conductive traces, conductive wires, connectors, and buses that cooperate to permit the transmission of electrical data signals to components such as processors, memories, sensors, input devices, output devices, and communication devices. Accordingly, the communication path 203 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal wave, triangular wave, square wave, vibration, and the like, capable of traveling through a medium.

The inquiry vehicle 101 or the neighboring vehicle 103 may include one or more memory components 202 coupled to the communication path 203. The one or more memory components 202 may comprise RAM, ROM, flash memories, hard drives, or any device capable of storing machine-readable and executable instructions such that the machine-readable and executable instructions can be accessed by the one or more processors 204. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory components 202. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 204 along with the one or more memory components 202 may operate as a controller for the inquiry vehicle 101 or the neighboring vehicle 103.

The one or more memory components 202 may include a coordination request and response module 222, a decentralized coordination module 232, and a centralized coordination module 242. Each of the coordination request and response module 222, the decentralized coordination module 232, and the centralized coordination module 242 may include, but not limited to, routines, subroutines, programs, objects, components, data structures, and the like for performing specific tasks or executing specific data types as will be described below. The data storage component 207 stores coordination pool data 227, coordination data 237, road and lane geometry data 247, data generated by the sensors, and data of operating vehicles 101 and 103, vision sensors 208, and wireless communication 250. The coordination request and response module 222, the decentralized coordination module 232, and the centralized coordination module 242 may also be stored in the data storage component 207 during operating or after operation.

Referring still to FIG. 2, the inquiry vehicle 101 or the neighboring vehicle 103 may include one or more vision sensors 208. The one or more vision sensors 208 may include a selection of, without limitations, a proximity sensor, a camera, a light detection and ranging (LIDAR) sensor, a thermal image sensor, an infrared sensor, an ultrasonic sensor, and/or a combination thereof. The camera may be, without limitation, a RGB camera, a depth camera, an infrared camera, a wide-angle camera, or a stereoscopic camera. The one or more vision sensors 208 may be any device having an array of sensing devices capable of detecting radiation in an ultraviolet wavelength band, a visible light wavelength band, or an infrared wavelength band. The one or more vision sensors 208 may have any resolution. In some embodiments, one or more optical components, such as a mirror, fish-eye lens, or any other type of lens may be optically coupled to the one or more vision sensors 208. In embodiments described herein, the one or more vision sensors 208 may provide image data to the one or more processors 204 or another component communicatively coupled to the communication path 203. In some embodiments, the one or more vision sensors 208 may also provide navigation support. That is, data captured by the one or more vision sensors 208 may be used to autonomously or semi-autonomously navigate a vehicle.

In some embodiments, the one or more vision sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain rough depth and speed information for the view of the inquiry vehicle 101 or the neighboring vehicle 103.

The inquiry vehicle 101 or the neighboring vehicle 103 may include one or more other sensors 212. Each of the one or more other sensors 212 is coupled to the communication path 203 and communicatively coupled to the one or more processors 204. The one or more other sensors 212 may include one or more motion sensors for detecting and measuring motion and changes in the motion of a vehicle. The motion sensors may include inertial measurement units. Each of the one or more motion sensors may include one or more accelerometers and one or more gyroscopes. Each of the one or more motion sensors transforms the sensed physical movement of the vehicle into a signal indicative of an orientation, a rotation, a velocity, or an acceleration of the vehicle.

The vision sensors 208 and the other sensors 212, such as the motion sensors may be used for the inquiry vehicle 101 and the neighboring vehicles 103 during the cooperation to fulfill the intended action 105. For example, the neighboring vehicle 103 may transmit the orientation, rotation, velocity, or acceleration of the neighboring vehicle 103 to inquiry vehicle 101 to assist the inquiry vehicle 101 in making a decision to take desirable actions, such as merging into the lane of the neighboring vehicle 103.

Referring back to FIGS. 2 and 3, the inquiry vehicle 101 or the neighboring vehicle 103 may include network interface hardware 206 for communicatively coupling the inquiry vehicle 101 to the neighboring vehicle 103 and/or the server 301. The network interface hardware 206 can be communicatively coupled to the communication path 203 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 206 includes hardware configured to operate in accordance with the Bluetooth® wireless communication protocol. The network interface hardware 206 of the inquiry vehicle 101 or the neighboring vehicle 103 may transmit its data to the neighboring vehicle 103, other neighboring vehicles 103, or the server 301. For example, the network interface hardware 206 of the inquiry vehicle 101 or the neighboring vehicle 103 may transmit vehicle data, location data, updated local model data, and the like to the neighboring vehicle 103, other neighboring vehicles 103, or the server 301.

The inquiry vehicle 101, the neighboring vehicle 103, or the server 301 may connect with each other, one or more external vehicle systems (e.g., the neighboring vehicle 103), and/or external processing devices (e.g., the server 301) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

The inquiry vehicle 101 or the neighboring vehicle 103 may be communicatively coupled to the server 301 by the wireless communication 250. In one embodiment, the wireless communication 250 may include one or more computer networks (e.g., a personal area network, a local area network, or a wide area network), cellular networks, satellite networks and/or a global positioning system and combinations thereof. Accordingly, the inquiry vehicle 101 or the neighboring vehicle 103 can be communicatively coupled to the wireless communication 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near-field communication protocols. Suitable cellular networks include, but are not limited to, technologies such as LTE, WiMAX, UMTS, CDMA, and GSM.

Referring back to FIG. 3, the server 301 includes one or more processors 304, one or more memory components 302, data storage component 307, server network interface hardware 306, and a local interface 303. The one or more processors 304 may be a controller, an integrated circuit, a microchip, a computer, or any other computing device. The one or more memory components 302 may comprise RAM, ROM, flash memories, hard drives, or any device capable of storing machine-readable and executable instructions such that the machine-readable and executable instructions can be accessed by the one or more processors 304. The one or more memory components 302 may include a server coordination module 322. The data storage component 307 stores the coordination pool data 227, the coordination data 237, and the road and lane geometry data 247. The server coordination module 322 may also be stored in the data storage component 307. The server coordination module 322 may include, but is not limited to, routines, subroutines, programs, objects, components, data structures, and the like for performing specific tasks or executing specific data types as will be described below.

Figure 4:
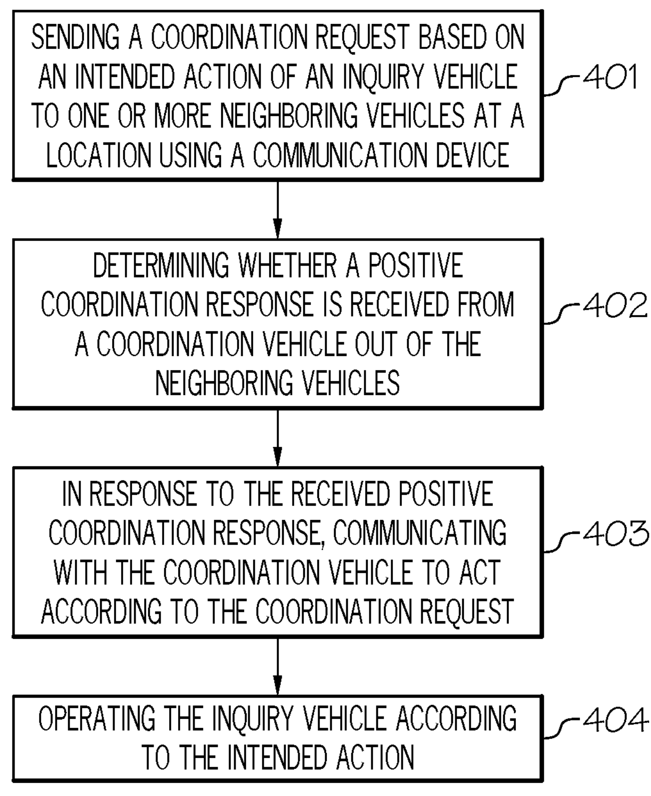
FIG. 4 depicts a flowchart of illustrative steps for consensus-based local route planning of the present disclosure, according to one or more embodiments shown and described herein.

FIG. 4 depicts a flowchart for illustrative steps for consensus-based local route planning of the present disclosure. The consensus-based local route planning may be operated using the coordination request and response module 222 among the vehicles 101 and 103 in accordance with the steps illustrated in FIG. 4. At block 410, the method for consensus-based local route planning includes sending a coordination request based on an intended action 105 of an inquiry vehicle 101 to one or more neighboring vehicles 103 at a location using a communication device (network interface hardware 206). At block 402, the method for consensus-based local route planning includes determining whether a positive coordination response is received from a coordination vehicle out of the neighboring vehicles 103. At block 403, the method for consensus-based local route planning includes, in response to the received positive coordination response, communicating with the coordination vehicle to act according to the coordination request. At block 404, the method for consensus-based local route planning includes operating the inquiry vehicle 101 according to the intended action 105.

In embodiments, the coordination request to one of the neighboring vehicles 103 may include, without limitations, a position, a speed, a direction, and the intended action 105 of the inquiry vehicle 101, and a coordination action of the one of the neighboring vehicles 103. The intended action 105 may be, without limitations lane changing, merging into a highway, passing, overtaking, U-turn, or exiting roundabouts.

In some embodiments, the method for consensus-based local route planning may include, in response to an absence of the positive coordination response, adjusting and resending the coordination request to the neighboring vehicles 103 at the location.

Figure 5:
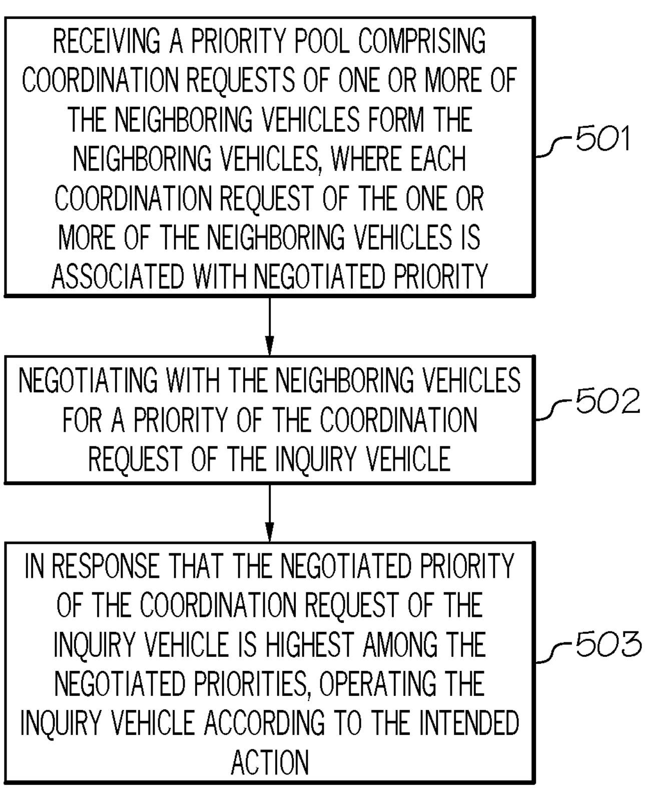
FIG. 5 depicts a flowchart for illustrative steps for consensus-based local route planning of multiple coordination requests of the present disclosure, according to one or more embodiments shown and described herein.

FIG. 5 depicts a flowchart for illustrative steps for consensus-based local route planning of multiple coordination requests among the vehicles of the present disclosure. The consensus-based local route planning based on a priority pool including more than one coordination request among the vehicles 101 and 103 may be operated using the decentralized coordination module 232 among the vehicles 101 and 103 in accordance with the steps illustrated in FIG. 5. At block 501, the method for consensus-based local route planning may include receiving a priority pool from the neighboring vehicles. The priority pool may include coordination requests of one or more of the neighboring vehicles 103. The priority pool may be stored in the coordination pool data 227 in the data storage component 207 at each vehicle 101 and 103 and in the data storage component 307 at each server 301. Each coordination request of the one or more of the neighboring vehicles 103 may be associated with a negotiated priority. The coordination requests may be ranked according to the negotiated priorities. The priority represents how soon the coordination request may be fulfilled. A coordination request associated with a higher priority precedes a coordination request associated with a lower priority.

At block 502, the method for consensus-based local route planning may include negotiating with the neighboring vehicles 103 for a priority of the coordination request of the inquiry vehicle 101. At block 503, the method for consensus-based local route planning may include, in response that the negotiated priority of the coordination request of the inquiry vehicle 101 is highest among the negotiated priorities, operating the inquiry vehicle 101 according to the intended action 105. During the operations, each fulfilled coordination request is removed from the priority pool. The coordination request of the next highest priority will be fulfilled.

In some embodiments, the priority of each coordination request is negotiated based on a timestamp associated with the coordination request. Each coordination request may be associated with a timestamp that indicates when the request was generated. The timestamp may be generated using a local system clock or a synchronized global time source like Network Time Protocol (NTP). In this way, the coordination requests may be placed in a priority queue or sorted based on their timestamps. In some embodiments, certain vehicles may be assigned specific priorities. For example, fire trucks, ambulances, and law enforcement vehicles may be categorized as emergency vehicles and the system 100 may assign the highest priority to these vehicles.

Figure 6:
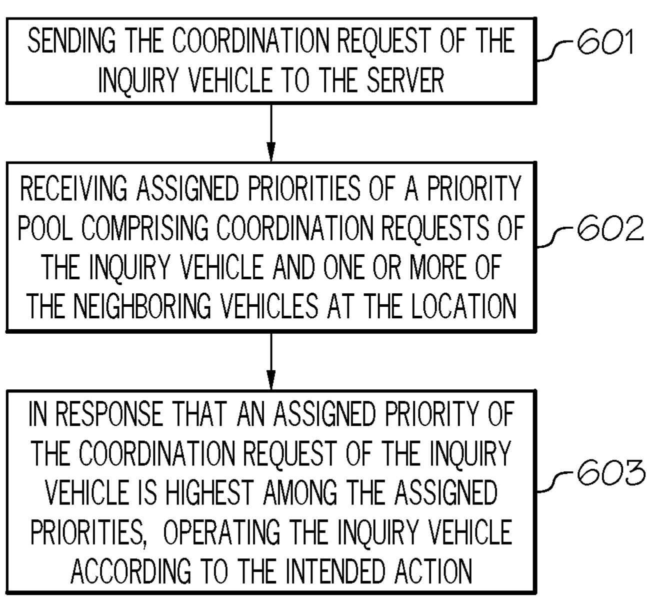
FIG. 6 depicts a flowchart for illustrative steps for the consensus-based local route planning of multiple coordination requests coordinated by a server of the present disclosure, according to one or more embodiments shown and described herein.

FIG. 6 depicts a flowchart for illustrative steps for the consensus-based local route planning of multiple coordination requests coordinated by the server 301 of the present disclosure. The consensus-based local route planning based on a priority pool including more than one coordination request among the vehicles 101 and 103 may be operated using the centralized coordination module 242 among the vehicles 101 and 103 in accordance with the steps illustrated in FIG. 6. At block 601, the method for consensus-based local route planning may include sending the coordination request of the inquiry vehicle 101 to a server 301. The assigned priorities of the coordination requests may be ranked based on, without limitations, timestamps of the coordination requests, route efficiency, vehicle type, and coordination pattern of each coordination request.

At block 602, the method for consensus-based local route planning may include receiving assigned priorities of a priority pool including coordination requests of the inquiry vehicle 101 and one or more of the neighboring vehicles 103 at the location. At block 603, the method for consensus-based local route planning may include, in response that an assigned priority of the coordination request of the inquiry vehicle 101 is highest among the assigned priorities, operating the inquiry vehicle according to the intended action 105. During the operations, each fulfilled coordination request is removed from the priority pool. The coordination request of the next highest priority will be fulfilled.

FIG. 6 depicts a flowchart for illustrative steps for the consensus-based local route planning of multiple coordination requests coordinated by the server 301 of the present disclosure. The consensus-based local route planning based on a priority pool including more than one coordination request among the vehicles 101 and 103 may be operated using the centralized coordination module 242 among the vehicles 101 and 103 in accordance with the steps illustrated in FIG. 6. At block 601, the method for consensus-based local route planning may include sending the coordination request of the inquiry vehicle 101 to a server 301. The assigned priorities of the coordination requests may be ranked based on, without limitations, timestamps of the coordination requests, route efficiency, predetermined priority (e.g., ambulances, fire trucks, large trucks, public transit), and coordination pattern of each coordination request.

The method to decide to perform the decentralized coordination or the centralized coordination may include receiving coordination requests of one or more of the neighboring vehicles 103 at the location. In response to determining a coordination-request number is less than or equal to a decentralized-coordination threshold, the method further may include negotiating with the neighboring vehicles 103 for a priority of the coordination request of the inquiry vehicle. In response to determining the coordination-request number is beyond the decentralized-coordination threshold, the method may further include sending the coordination request to a server 301 to assign the priority of the coordination request of the inquiry vehicle 101. The method may include operating the inquiry vehicle 101 according to the intended action 105 in response that the priority of the coordination request of the inquiry vehicle 101 is higher than priorities of the coordination request of the one or more of the neighboring vehicles 103. In embodiments, the decentralized-coordination threshold may be determined based on a selection of, without limitations, traffic density at the location, complexity of the road at the location, communication reliability between the inquiry vehicle and the neighboring vehicles, cooperation history between the inquiry vehicle and the neighboring vehicles, or a combination thereof.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for local route planning comprising:

a communication device operable to wirelessly communicate with one or more neighboring vehicles at a location;

a processor operable to:

send a coordination request based on an intended action of an inquiry vehicle to the neighboring vehicles at the location;

determine whether a positive coordination response is received from a coordination vehicle out of the neighboring vehicles;

in response to the received positive coordination response, communicate with the coordination vehicle to act according to the coordination request;

receive coordination requests of one or more of the neighboring vehicles at the location;

in response to determining a total number of coordination requests is less than or equal to a decentralized-coordination threshold, negotiate with the neighboring vehicles for a priority of the coordination request of the inquiry vehicle;

in response to determining the total number of coordination requests is beyond the decentralized-coordination threshold, send the coordination request to a server to assign the priority of the coordination request of the inquiry vehicle;

receive priorities of the coordination request of the one or more neighboring vehicles; and autonomously operate the inquiry vehicle according to the intended action in response that the priority of the coordination request of the inquiry vehicle is higher than priorities of the coordination request of the one or more of the neighboring vehicles.

2. The system of claim 1, wherein the coordination request to one of the neighboring vehicles comprises a position, a speed, a direction, and the intended action of the inquiry vehicle, and a coordination action of the one of the neighboring vehicles.

3. The system of claim 1, wherein the intended action is lane changing, merging into a highway, passing, overtaking, U-turn, or exiting roundabouts.

4. The system of claim 1, wherein in response to an absence of the positive coordination response, the processor is operable to further adjust and resend the coordination request to the neighboring vehicles at the location.

5. The system of claim 1, wherein the processor is operable to further:

receive a priority pool comprising coordination requests of one or more of the neighboring vehicles from the neighboring vehicles, where each coordination request of the one or more of the neighboring vehicles is associated with a negotiated priority;

negotiate with the neighboring vehicles for a priority of the coordination request of the inquiry vehicle; and in response that the negotiated priority of the coordination request of the inquiry vehicle is highest among the negotiated priorities, operate the inquiry vehicle according to the intended action, wherein the coordination requests are ranked according to the negotiated priorities, and each fulfilled coordination request is removed from the priority pool.

6. The system of claim 5, wherein each coordination request comprises a timestamp, and the priority is negotiated based on the timestamp.

7. The system of claim 1, wherein the processor is operable to further:

send the coordination request of the inquiry vehicle to a server;

receive assigned priorities of a priority pool comprising coordination requests of the inquiry vehicle and one or more of the neighboring vehicles at the location;

in response that an assigned priority of the coordination request of the inquiry vehicle is highest among the assigned priorities, operate the inquiry vehicle according to the intended action; and wherein each fulfilled coordination request is removed from the priority pool.

8. The system of claim 7, wherein the assigned priorities of the coordination requests are ranked based on timestamps of the coordination requests and predetermined priority,.

9. The system of claim 1, wherein the decentralized-coordination threshold is determined based on a selection of traffic density at the location, communication reliability between the inquiry vehicle and the neighboring vehicles, cooperation history between the inquiry vehicle and the neighboring vehicles, or a combination thereof.

10. The system of claim 1, wherein the decentralized-coordination threshold is determined based on communication reliability between the inquiry vehicle and the neighboring vehicles and cooperation history between the inquiry vehicle and the neighboring vehicles, wherein the cooperation history comprises historical coordination operations according to intended actions of the coordination requests between the inquiry vehicle and the neighboring vehicles.

11. A method for local route planning comprising:

sending a coordination request based on an intended action of an inquiry vehicle to one or more neighboring vehicles at a location using a communication device;

determining whether a positive coordination response is received from a coordination vehicle out of the neighboring vehicles;

in response to the received positive coordination response, communicating with the coordination vehicle to act according to the coordination request;

receiving coordination requests of one or more of the neighboring vehicles at the location;

in response to determining a total number of coordination requests is less than or equal to a decentralized-coordination threshold, negotiating with the neighboring vehicles for a priority of the coordination request of the inquiry vehicle;

in response to determining the total number of coordination requests is beyond the decentralized-coordination threshold, sending the coordination request to a server to assign the priority of the coordination request of the inquiry vehicle;

receiving priorities of the coordination request of the one or more neighboring vehicles; and autonomously operating the inquiry vehicle according to the intended action in response that the priority of the coordination request of the inquiry vehicle is higher than priorities of the coordination request of the one or more of the neighboring vehicles.

12. The method of claim 11, wherein the coordination request to one of the neighboring vehicles comprises a position, a speed, a direction, and the intended action of the inquiry vehicle, and a coordination action of the one of the neighboring vehicles.

13. The method of claim 11, wherein the intended action is lane changing, merging into a highway, passing, overtaking, U-turn, or exiting roundabouts.

14. The method of claim 11, wherein in response to an absence of the positive coordination response, the method further comprises adjusting and resending the coordination request to the neighboring vehicles at the location.

15. The method of claim 11, wherein the method further comprising:

receiving a priority pool comprising coordination requests of one or more of the neighboring vehicles from the neighboring vehicles, where each coordination request of the one or more of the neighboring vehicles is associated with a negotiated priority;

negotiating with the neighboring vehicles for a priority of the coordination request of the inquiry vehicle; and in response that the negotiated priority of the coordination request of the inquiry vehicle is highest among the negotiated priorities, operating the inquiry vehicle according to the intended action, wherein the coordination requests are ranked according to the negotiated priorities, each fulfilled coordination request is removed from the priority pool and each coordination request comprises a timestamp, and the priority is negotiated based on the timestamp.

16. The method of claim 11, wherein the method further comprises:

sending the coordination request of the inquiry vehicle to a server;

receiving assigned priorities of a priority pool comprising coordination requests of the inquiry vehicle and one or more of the neighboring vehicles at the location;

in response that an assigned priority of the coordination request of the inquiry vehicle is highest among the assigned priorities, operating the inquiry vehicle according to the intended action; and wherein each fulfilled coordination request is removed from the priority pool.

17. The method of claim 16, wherein the assigned priorities of the coordination requests are ranked based on timestamps of the coordination requests and predetermined priority.

18. The method of claim 11, wherein the decentralized-coordination threshold is determined based on communication reliability between the inquiry vehicle and the neighboring vehicles, cooperation history between the inquiry vehicle and the neighboring vehicles, or a combination thereof, wherein the cooperation history comprises historical coordination operations according to intended actions of the coordination requests between the inquiry vehicle and the neighboring vehicles.

* * * * *